United States Patent

[11] 3,587,427

| [72] | Inventor | Yoshio Nitta<br>Osaka, Japan |
|---|---|---|
| [21] | Appl. No. | 722,256 |
| [22] | Filed | Apr. 18, 1968 |
| [45] | Patented | June 28, 1971 |
| [73] | Assignee | Minotta Camera Kabushiki Kaisha<br>Minami-Ku, Osaka, Japan |
| [32] | Priority | Apr. 21, 1967 |
| [33] | | Japan |
| [31] | | 42/25594 |

[54] FILM ADVANCE AND SHUTTER CHARGING DEVICE FOR USE IN 16 MM. CAMERAS
4 Claims, 11 Drawing Figs.

[52] U.S. Cl. ............................................... 95/31AC
[51] Int. Cl. ................................................ G03b 1/62, G03b 9/68
[50] Field of Search .................................... 95/31, 31 (DS), 31 (AC); 33/129, 132, 136

[56] References Cited
UNITED STATES PATENTS

| 2,926,424 | 3/1960 | Weiss | 95/31(X) |
| 3,073,229 | 1/1963 | Madge | 95/31(PS) |
| 3,216,777 | 11/1965 | Allen | 95/31(X) |
| 3,426,665 | 2/1969 | Maeda | 95/31 |

FOREIGN PATENTS

| 727,352 | 10/1942 | Germany | 95/31D.S. |

Primary Examiner—Samuel S. Matthews
Assistant Examiner—Russell E. Adams, Jr.
Attorney—Waters, Roditi, Schwartz & Nissen ABSTRACT: A device is provided for stopping the winding rotation of a film cartridge and for charging a shutter, for use in small-sized photographic cameras such as a 16 mm. photographic camera, and wherein the winding of the film, its stopping, and the charging of the shutter are performed by a film winding knob which is rotatable only in one direction. The stopping operation of the film winding and the shutter charging operation are registered by a register cam rotatable through an angle which is a divisor of 360°, in cooperation with the film winding knob which is rotated for a given angle for winding the predetermined length of the film.

FILM ADVANCE AND SHUTTER CHARGING DEVICE FOR USE IN 16 MM. CAMERAS

BACKGROUND OF THE INVENTION

In the conventional device for stopping the film winding and charging the shutter by a unidirectional film winding knob, the film winding operation and its stopping operation have been effected in conjugation with the angular rotation of the knob for a divisor of 360° such as 360°, 180° or 120°.

By so selecting the rotational angle, the knob is returned to the initial angular position by operating it an integer number of times. Thus, the rotation of the knob is further repeated. Without such relation, the stopping mechanism and also the shutter charging mechanism would become very complicated, and impractical.

On the other hand, it has now become the main tendency in the world to adopt a picture frame size of 12mm. × 17 mm. for 16 mm. photographic cameras, instead of the conventional picture frame size of 10mm. × 14mm.

However, 16 mm. film now sold are yet contained in cartridges which have film winding drums of a size suitable for the conventional 10mm. × 14 mm. picture.

For this reason, there is need for a device for film stopping and shutter charging to obtain a photographic picture size of 12mm. × 17 mm. even with the above-mentioned conventional cartridge.

In order to meet this need, it can be proposed to use two cartridges having therein film winding drums of different diameters, respectively. Such utilization of two different cartridges however may invite confusion or misunderstanding to the users and eventually spoil the film by selecting an improper cartridge.

SUMMARY OF THE INVENTION

The present invention has for its object to eliminate such confusion by using conventional cartridge directly engaging with a film winding knob, and stopping the film winding at a desired length of the film. According to this invention, the desired film stopping operation and the shutter charging operation are effected by arranging a register cam on a register gear which is in mesh with a winding gear of the film winding knob, and suitable selecting the gear ratio of both gears for rotating the register cam by an angle corresponding to a divisor of the angle of circumference 360° when a predetermined length of film has been wound by the action of the film winding knob, thereby the film stopping operation and the shutter charging operation being effected by the register cam.

BRIEF DESCRIPTION OF THE DRAWINGS

FIGS. 7 through 9 are enlarged perspective views showing the various relations between a claw of a driving lever and that of an actuating lever, wherein FIG. 7 shows the relation thereof after the shutter has been released, FIG. 8 is that during charging of the shutter, FIG. 9 is that during releasing the shutter.

DESCRIPTION OF THE PREFERRED EMBODIMENTS

In most prevailing photographic cameras of 16 mm. size, the length of the picture size is standardized as 14mm. The diameter of a winding cartridge drum for use in such cameras is designed to wind up the film in such a manner that the necessary length of the picture, i.e. 14 mm. and the interval between the adjacent pictures, i.e. about 2 mm. are obtained when the cartridge drum has been rotated by 120° through the direct engagement with the film winding knob.

In order to use the above-mentioned conventional cartridge in the 16 mm. cameras of 12mm. × 17 mm. picture frame size which is now prevailing in the world, it is necessary to increase the rotation angle of the winding drum and of the film winding knob directly engaged therewith. If the rotation angle of 135° is selected, the following relation stands:

$$(14 \text{ mm.} + 2 \text{ mm.}) \times \frac{135}{120} = 18 \text{ mm.}$$

This is sufficient for the purpose. According to the present invention, there are provided eight engaging projections around a film stopping ring secured to the film winding knob. The angle between adjacent engaging projections thus becomes 45°. When a length corresponding to three engaging projections is wound up, a register cam which is in mesh with a stopping gear integrally rotating with the stopping ring, is rotated by a certain angle, that is a divisor (for example, 360°, 180°, 120° or 90°) of the angle of circumference 360°. Thus, the registration of the film stopping can be effected to set the picture length to 17mm.

Now, the features of the present invention will be fully explained with reference to the embodiments illustrated in the accompanying drawings.

In the embodiment shown in FIGS. 1 through 9, there is provided a chassis 2 fixed within an outer frame 1 of a small sized photographic camera. This chassis carries almost all of the parts concerning the film winding and stopping mechanism and the shutter mechanism.

Figure 1:
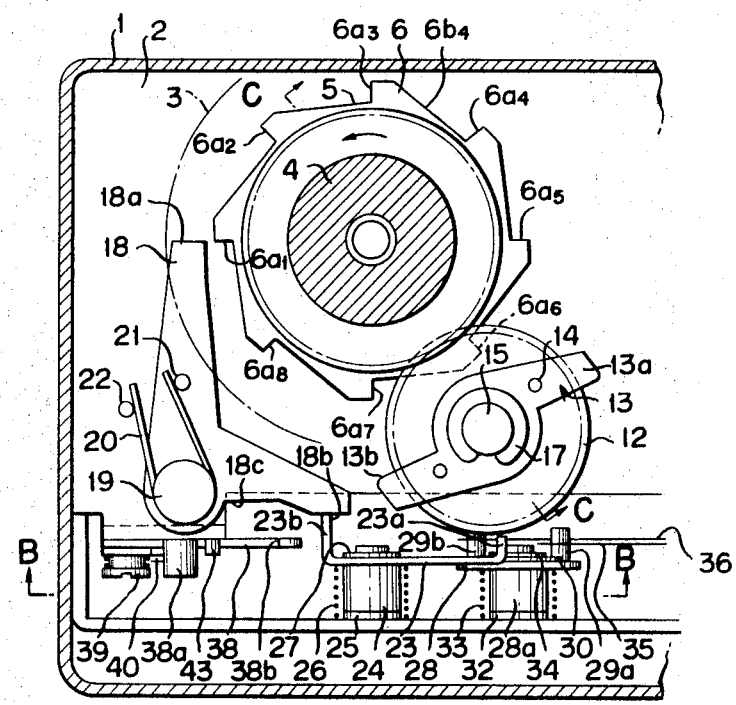
FIG. 1 is a top view, with parts cut away, of an embodiment of the present invention, in which a shutter of the camera is in a released position.
Figure 3:
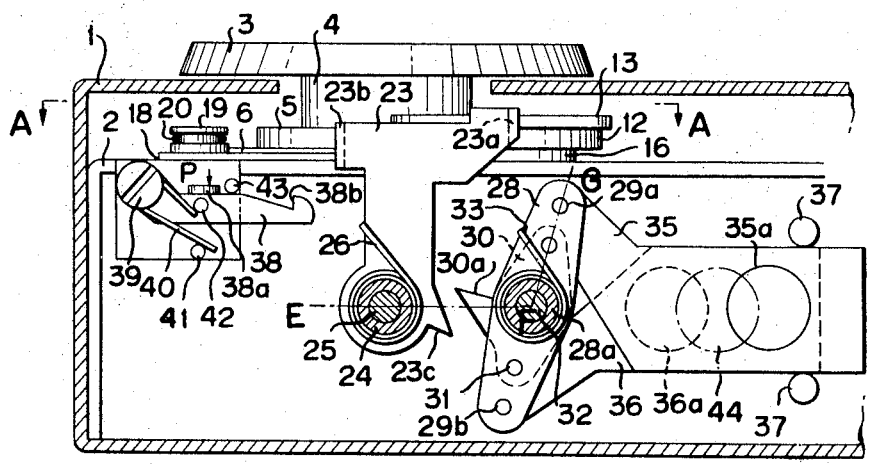
FIG. 3 is a longitudinal section along a line B-B in FIG. 1.
Figure 2:
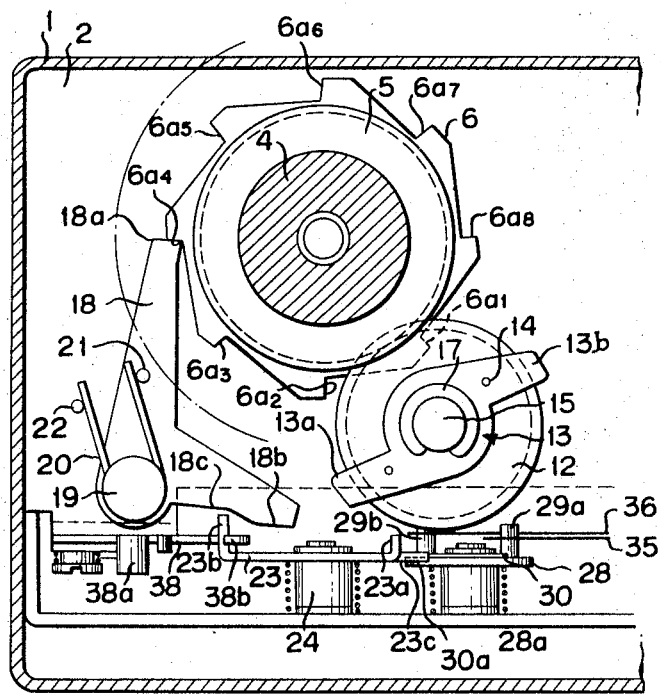
FIG. 2 is a similar view in which the shutter is charged.
Figure 4:
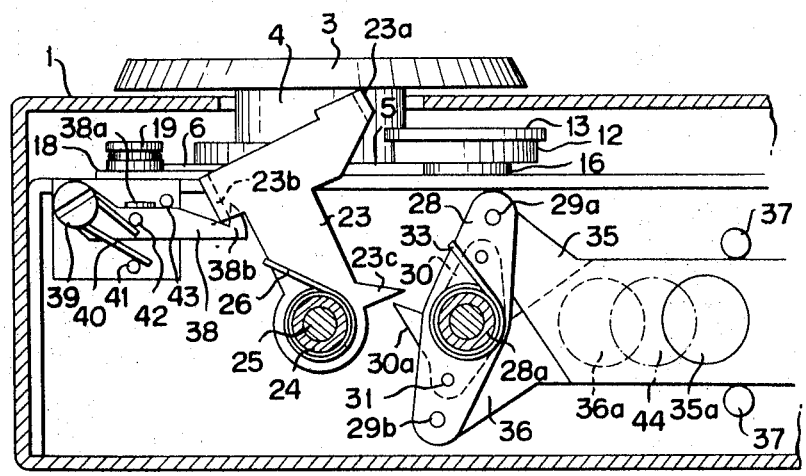
FIG. 4 is a sectional front view including the axis of a winding shaft in FIG. 2.
Figure 5:
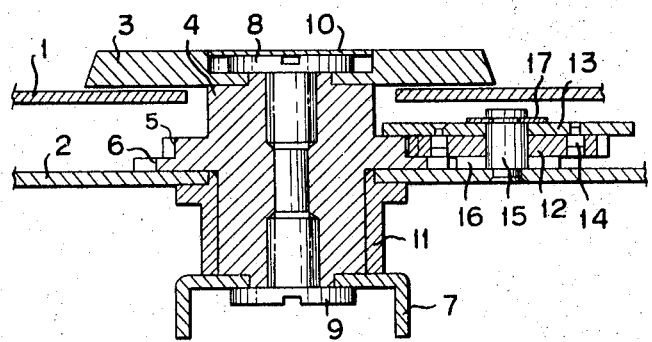
FIG. 5 is a longitudinal section along a line C-C in FIG. 1.
Figure 6:
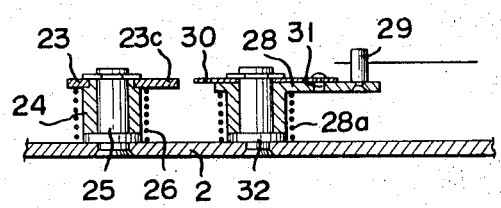
FIG. 6 is a section along a line E-F-G in FIG. 3.

The film winding knob 3 shown in solid lines in FIGS. 3 and 4 and also by broken lines in FIGS. 1 and 2 is secured to a shaft 4 by a knob securing bolt 8 and its cover 10. The shaft 4 has an integral winding gear 5 and also an integral stopping ring 6. As shown in FIG. 5, a winding claw 7 is secured to the lower end of the shaft 4 by a fixing bolt 9, for enabling engagement of the claw 7 with a winding drum of a cartridge.

The stopping ring 6 is provided with eight engaging projections $6a_1$—$6a_8$ which are arranged at equal angular intervals. Accordingly, the angle formed between two adjacent projections is 45°.

A register cam 13 is integrally mounted on a register gear 12 (which is in mesh with the winding gear 5) by means of a pin 14, and is integrally fixed to a register shaft 15 by a split washer 17. The gear ratio of the winding gear 5 and the register gear 12 is so selected that the register gear 12 will rotate by divisor of 360° when the winding gear 5 is rotated by a certain angle corresponding to the desired length of the picture. In this embodiment, the ratio is chosen as 4:3 so that the register gear 12 will be rotated by 180° when the winding gear 5 is rotated by 135°.

A stopping lever 18 is pivoted by a shaft 19 and is urged to swing in the clockwise direction in FIGS. 1 and 2 by means of a spring 20 and pins 21 and 22. One arm 18a of the lever 18 is engaged with any one of the engaging projections $6a_1$—$6a_8$ of the stopping ring 6 for preventing the rotation of the stopping ring 6.

A bushing 24 is loosely fitted on a shaft 25 of chassis 2 in a perpendicular relation with the above-mentioned members. A shutter lever 23 is journaled on the bushing and restrained by a split washer so as not to escape therefrom. The driving lever 23 is urged to be rotated in the clockwise direction in FIGS. 3 and 4 by a strong spring 26. At the upper back end of the shutter driving lever 23, there is formed a bent trailing edge 23b for restraining a restraining arm 18b of the above-mentioned winding lever 18. At the front end of lever 23, there is formed a head edge 23a to be engaged with a projection 13a or 13b of the register cam 13. This head edge 23a is bent to form a right angle to its main part.

Furthermore, a driving claw 23c projects from lever 23 near the bushing 24.

An operating lever 28 is secured by a pin 31 to an actuating lever 30 which is composed of a resilient plate having a driven claw 30a adapted to be engaged with above-mentioned driving claw 23c. The operating lever 28 is journaled on a shaft 32 and is prevented from escape by a split washer 34. The lever 28 is urged in rotation in the clockwise direction by means of a relatively weak spring 33. Journaled on operating pins 29a and 29b fixed to the operating lever 28 are respective end of shutter sectors 35 and 36 for allowing lateral movements of the shutter sectors 35 and 36 guided by guiding pins 37.

Thus, respective exposure apertures 35a and 36a control the size of a light opening 44.

A shutter button lever 38 is pivoted on a shaft 39 and is urged in rotation in the counterclockwise direction by means of a spring 40 and pins 41 and 42 so that it will always abut against a stopper 43. At the top end of the shutter lever 38, there are provided a hook 38b for hooking the trailing edge 23b of the driving lever 23 and an engaging surface 38a for engaging a shutter push button (not shown).

Next, the operation or actuation of the above-mentioned structure will be explained in detail.

When the film winding knob 3 is rotated in the direction of the arrow shown in FIG. 1 after the shutter has been released, the winding claw 7 will wind the film through the direct engagement with the winding drum of the cartridge, and at the same time, the winding gear 5 will rotate the register gear 12 by 180°, and thereby the projection 13a of the register cam 13 will be rotated in the clockwise direction in FIG. 1.

The projection 13a engages the head edge 23a of the driving lever 23 before knob 3 completes its 135° rotation and rotates lever 23 in the counterclockwise direction. Accordingly, the trailing edge 23b of the driving lever 23 will release the restraining arm 18b of the winding lever 18 which is in turn rotated in the clockwise direction in FIG. 1 by spring 20. Assuming that the engaging projection before the winding starts is $6a_1$, the engaging arm 18a of the lever 18 becomes positioned between the engaging projection $6a_3$ which is offset from the engaging projection $6a_1$ by an angle of 120°, and the projection $6a_4$ which has an angle of 135° with the projection $6a_1$. At the same time, the trailing edge 23b of the driving lever 23 is in engagement with the hook 38b of the shutter lever 38 and retains its position.

Figure 7:
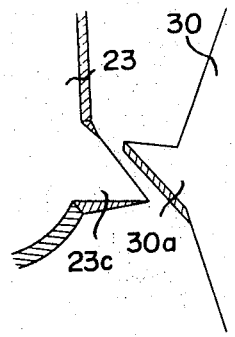
Figure 8:
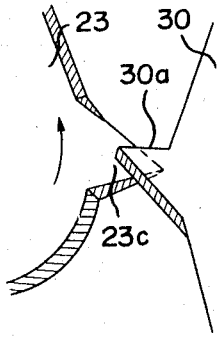
Figure 9:
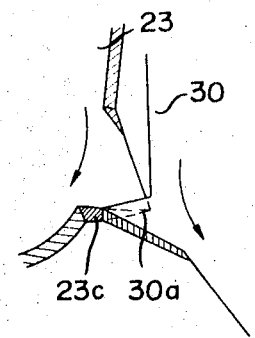

When the film winding knob 3 continues its rotation, the projection 13a of the register cam 13 will pass the head edge 23a of the driving lever 24 thereby releasing the lever 23 which remains in engagement with the trailing edge 23b and the hook 38b. The projection 13a further advances to the position originally occupied by the other projection 13b (the position shown in FIG. 1). Thus, the engaging arm 18a of the winding lever 18 becomes engaged with the engaging projection $6a_4$ of the winding ring 6 so that further rotation of the winding knob 3 is prevented, as shown in FIGS. 2 and 4. During this procedure, the driving claw 23c of the driving lever 39a will be abutted against the driven claw 30a of the actuating lever 30. The driving claw 23c is formed with an edgelike shape at its upper end as shown in FIGS. 7 through 9 in an enlarged scale, and the driven claw 30a has a slight resiliency. Accordingly, when the shutter is charged or cocked, the side surface of the driving claw 23c advances upwardly pushing aside the driven claw 30. The actuating lever 30 will remain at rest without being rotated, and the relation between the two claws will be interchanged as shown in FIG. 4.

When the shutter push button (not shown) is pushed down after the shutter charge has been completed as shown in FIGS. 2 and 4, the shutter lever 38 is rotated in the clockwise direction by its abutment against the engaging surface 38a, against the force of the spring 40. The engagement between the hook 38b of the shutter lever 38 and the trailing edge 23b of the driving lever 23 will accordingly be released, thereby allowing the rotation of the driving lever 23 in the clockwise direction by the driving force produced by the strong spring 26.

During this travel of the driving lever 23, the relatively wide lower edge of the driving claw 23c will engage with the driven claw 30a of the actuating lever 30 as shown in FIG. 9, to rotate the driven claw 30a in the counterclockwise direction. In accordance with this rotation, the operating lever 28 also is rotated in the same direction, thereby shifting the shutter sector 35 to the left by means of the pin 29a, and the shutter sector 36 to the right by pin 29b. Thus, the shutter sector holes 35a and 36a will be aligned in the photographing light path opening 44 for enabling the desired exposure. When the engagement between the two claws are released, the operating lever 28 will be rotated in the clockwise direction by the force of its own spring 33, and the shutter sectors 35 and 36 will close the opening 44. By the clockwise rotation of the driving lever 23, its trailing edge 23b pushes the restraining arm 18b of the stopping lever 18 for rotating it in the counterclockwise direction, against the force of the spring 20. Accordingly, the engagement between the engaging arm 18a of the winding lever 18 and the engaging projection $6a_4$ of the stopping ring 6 will be released, and the film winding knob 3 returns to the position shown in FIGS. 1 and 3 for a new rotation. It will be apparent that the above-mentioned operation can be repeated, for instance, by the winding operation to engage the engaging arm 18a with the engaging projection $6a_7$ of the ring 6.

Figure 10:
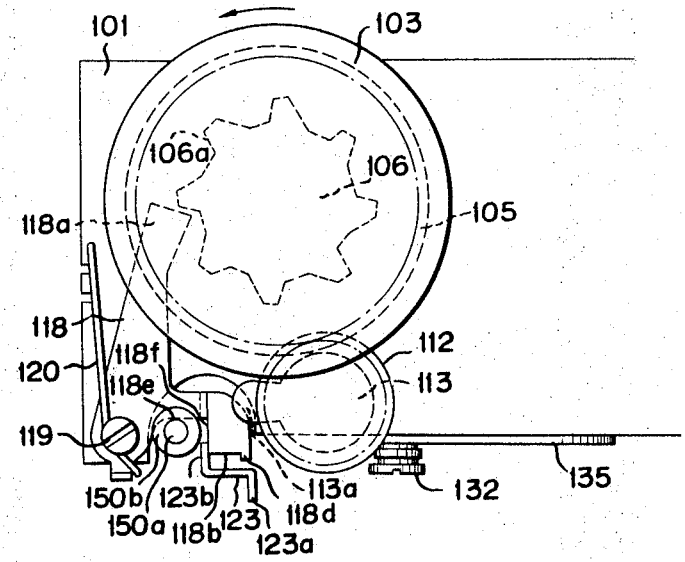
FIG. 10 is a top view, with parts in section, of another embodiment of the present invention.
Figure 11:
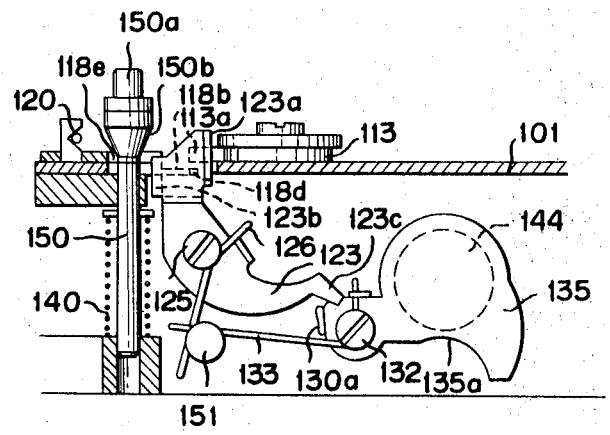
FIG. 11 is a front view thereof, with parts cut away.

FIGS. 10 and 11 show another embodiment of a 16 mm. photograph camera which is in a position where the shutter has been charged and the stopping of the winding operation has been completed.

Starting from the above-mentioned condition, a shutter pushbutton 150a is depressed. A sloped surface 150b will push an actuating edge 118e of a stopping lever 118 to swing the lever in the counterclockwise direction in FIG. 10, against the force of a spring 120. Accordingly, the engaging arm 118a will be retracted from the engaging projection 106a of the stopping plate 106. The engaging edge 118f escapes from the engagement with the trailing edge 123b of a driving lever 123, and the driving lever 123 is driven in the clockwise direction by a strong spring 126. By this movement of the driving lever 123, a driven claw 130a of a shutter sector 135 is rotated through a certain angle in the counterclockwise direction by a driving claw 123c for opening a light opening 144. When the driving claw 123c has been further rotated and released from the engagement with the driven claw 130a, the shutter sector 135 will be rotated in the clockwise direction by the force of a spring 133 for closing the shutter. On the other hand, the rotation of the driving lever is stopped by its abutment against a stopping projection 118d, and the restraining edge 118b of the stopping lever 118 keeps its stopping release position by the restraint of the trailing edge 123b of the driving lever 123.

When the winding knob 103 is then rotated in the counterclockwise direction, the film winding drum of the cartridge, which is directly engaged with the knob will be rotated to wind the film. At the same time, a register cam 113 is rotated by a register gear 112 meshed with a winding gear 105. Provided that the gear ratio is chosen as 8:3, the register cam 113 is rotated by 360° for a rotation of 135° of the winding gear. During such rotation of the register cam 113, its extreme edge 113a is brought into contact with a head edge 123a of the driving lever 123 and rotates it in the counterclockwise direction against the force of the spring 126, and also its engaging projection 118a is brought into contact with an engaging projection 106a of a stopping plate 106 so that the rotation of the film winding knob 103 is prevented as shown in FIG. 10, thereby winding the desired length of the film.

I claim:

1. A device for stopping the takeup of film and for charging a shutter for use in small sized cameras, said device comprising shutter charging means, a film winding register means including eight engaging projections spaced at equal angular intervals at the outer periphery thereof, a film winding knob connected to said register means, said register means being associated with a film winding drum in a cartridge, a rotatable drive means for said shutter charging means, a shutter charging cam rotationally coupled with said film winding register means and including a projection for abutting and pushing said drive means so that it undergoes rotation by the rotation of said film winding register means, means coupling said register means and said shutter charging cam to cause said shutter charging cam to undergo an integral number of half turns for 135° of rotation of said film winding register means, and a rotatable film stopping lever, said drive means including a first engaging portion for actuating said shutter charging means and a second portion for abutment with said rotatable lever, said rotatable film stopping lever being rotated by variation of the abutment relationship thereof with said engaging portion of said drive means for stopping the rotation of said film winding knob by the engagement with one of said engaging projections of said film winding register means after the register means has been rotated by 135°.

2. A device as claimed in claim 1 wherein said shutter charging cam includes two projections at 180° from one another, said cam being rotated by said register means one-half turn for each 135° of rotation of said register means whereby the projections successively abut and push the drive means.

3. A device as claimed in claim 1 wherein said shutter charging cam includes a single projection and said cam is rotated by said register means one full turn for each 135° of rotation of said register means.

4. A device as claimed in claim 1 comprising a shutter lever positioned to engage said drive means and hold the same after it has been rotated by the register means, said shutter lever being releasable to free said drive means for return to its original position during which time the shutter is opened.